United States Patent Office 3,520,873
Patented July 21, 1970

3,520,873
INOSINE 2',3', ACETALS
Max Thiel, Mannheim, and Kurt Stach, Wolfgang Schaumann, and Karl Dietmann, Mannheim-Waldhof, and Klaus Hardebeck, Ludwigshafen (Rhine), Germany, assignors to Boehringer Mannheim GmbH, Antsgeicht, Mannheim, Germany
No Drawing. Filed Aug. 16, 1967, Ser. No. 660,911
Claims priority, application Germany, Oct. 26, 1966, B 89,570
Int. Cl. C07d 51/50
U.S. Cl. 260—211.5                                    5 Claims

ABSTRACT OF THE DISCLOSURE

A novel class of inosine acetals is disclosed, the same constituting useful chemotherapeutic agents having circulation stimulating properties.

The inosine acetals of the invention are represented by the following formula:

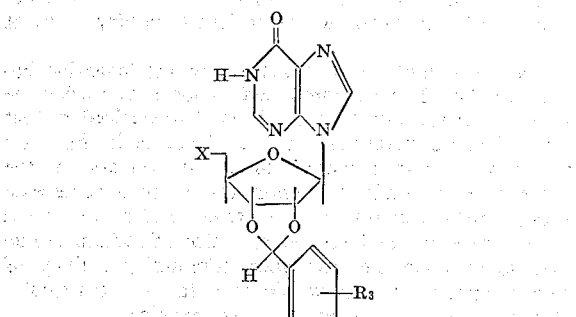

wherein $R_1$, $R_2$ and $R_3$ are each hydrogen, halogen, alkyl, alkoxy, methylenedioxy or trifluoromethyl and X is halogen or hydroxyl.

---

This invention relates to inosine acetals, and to processes for making and using such compounds.

More particularly the invention relates to inosine acetals of the formula:

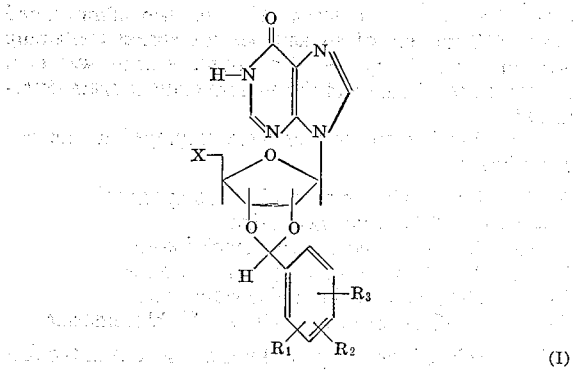

wherein $R_1$, $R_2$ and $R_3$ are each hydrogen, halogen, alkyl, alkoxy, methylenedioxy or trifluoromethyl and X is halogen or hydroxyl.

The inosine acetals are useful chemotherapeutic agents having circulatory system stimulating activity. The inosine acetals stimulate the coronary and peripheral vasculatures. They also have direct cardiac effects which augment heart rate and increase cardiac output. In addition the inosine acetals promote sodium diuresis.

The greatest clinical usefulness of the inosine acetals of the invention would appear to be in the treatment of patients with clinically apparent congestive failure, the compounds of the invention serving to at least partially reverse the hemodynamic abnormalities of congestive heart failure and other low cardiac output states. Other instances are in the treatment of bradycardia, low cardiac output states, particularly following open-heart surgery or in cardiogenic shock etc.

The novel inosine acetals according to the present invention can be made by known methods. Thus, for example, the inosine acetals can be made by the method of reacting a compound of the formula:

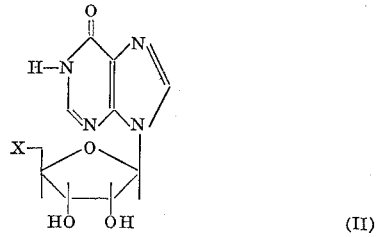

wherein X is as above, with an aldehyde of the formula:

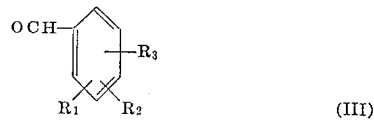

wherein $R_1$, $R_2$ and $R_3$ have the same significance as given above, or with the acetal thereof in the presence of acidic catalysts and thereafter, when X is a hydroxyl group, this can be, if desired, replaced by a halogen atom.

In carrying out the process according to the present invention, the inosine derivative (II) is heated with the aldehyde (III) to a temperature of 50–70° C. in the presence of an acidic catalyst, such as zinc chloride. In place of the free aldehyde, its acetal can be used, in which case hydrochloric acid, toluene-sulfonic acid or trifluoroacetic acid can be used as acidic catalyst.

The acetal employed in the reaction is preferably dimethyl or diethyl acetal.

According to a particularly preferred embodiment of the process, the inosine derivative (II) is reacted, in an acidic medium, with the aldehyde (III) and with orthoformic acid methyl or ethyl ester. The acetal which is thereby formed as intermediate is then further reacted, according to the present invention, to provide the Compound I.

When, in the Compound I which is obtained, X is a hydroxyl group, then, if desired, this compound can be converted into the corresponding Compound I in which X is a halogen atom. For this purpose, the compound is first reacted, in the conventional manner, with the halide of an aromatic sulfonic acid to produce the corresponding 5'-sulfonic acid ester, which is then further reacted with an alkali metal halide to produce the corresponding 5'-halo Compound I. It is preferred to use tosyl chloride or brosyl chloride and to thereafter react the 5'-esters obtained with the alkali metal halide in an inert, polar solvent, such as, for example, dimethyl formamide.

The Compound II used as the starting material in which X is a halogen atom, can be prepared, by the known methods, as for example, by the reaction of 2',3'-O-isopropylidene-5'-tosyl-inosine (see J. Biol. Chem., 121, 146/1937) with an alkali metal halide, followed by removal of the protective group by acidic hydrolysis.

The invention is further illustrated by the following examples. The examples serve merely to illustrate the invention, however, and modifications such as are within the scope of the appended claims are included in the metes and bounds of the invention.

EXAMPLE 1

Exo-2',3'-O-benzylidene-inosine 50 ml. 5 N hydrochloric acid in dioxan were added to a mixture of 28 g. inosine, 10 ml. dimethyl formamide, 30 ml. benzaldehyde and 60 ml. orthoformic acid ethyl ester. On warming, all of the components went into solution. The reaction mixture was then left to stand for 2–3 days and thereafter poured into an aqueous solution of ammonium bicarbonate. The solid material which formed was filtered off with suction and then washed with water and ether. There were obtained 23.8 g. (64.5% of theory) exo-2',3'-O-benzylidene-inosine, which had a melting point of 228.5–230.5° C.

EXAMPLE 2

Exo-2',3'-O-(4-methyl-benzylidene)-inosine 6 ml. 6 N hydrochloric acid in dioxan were added, while stirring, to a mixture of 5 g. inosine, 50 ml. dimethyl formamide and 10 g. 4-methyl-benzylaldehyde dimethyl acetal. After standing for two days at a temperature of about 5° C., the reaction mixture was poured into a solution of 8 g. ammonium bicarbonate in 500 ml. water. Following extraction of the reaction mixture, with ether, the solid material was filtered off with suction. There were obtained 4.1 g. (67% of theory) exo-2',3'-O-(4-methyl-benzylidene)-inosine, which had a melting point of 215–218° C.

EXAMPLE 3

Exo-2,3'-(3-chlorobenzylidene)-inosine

In a manner analogous to that described in Example 2, but with the use of 10 g. 3-chlorobenzaldehyde dimethyl acetal, there were obtained 2.2 g. (31% of theory) exo-2',3'-O-(3-chlorobenzylidene)-inosine, which had a melting point of 218–220° C.

EXAMPLE 4

Exo-2',3'-O-(4-chlorobenzylidene)-inosine

In a manner analogous to that described in Example 2, but with the use of 10 g. 4-chlorobenzaldehyde dimethyl acetal, there were obtained 4.4 g. (62% of theory) exo-2',3'-O-(4-chlorobenzylidene)-inosine, which had a melting point of 241–243° C. (decomp.).

EXAMPLE 5

2',3'-O-(4-methoxy-benzylidene)-inosine

In a manner analogous to that described in Example 2, but with the use of 10 g. 4-methoxy-benzaldehyde dimethyl acetal, there were obtained 4 g. (56% of theory) 2',3'-O-(4-methoxy-benzylidene)-inosine (exo-endo mixture), which had a melting point of 199–201° C.

EXAMPLE 6

Exo-2',3'-O-benzylidene-5'-desoxy-5'-chloroinosine

*Variant A.*—A mixture of 2.5 g. 5'-desoxy-5'-chloroinosine, 6 ml. dimethyl formamide and 6 g. benzaldehyde dimethyl acetal was mixed with 4 ml. 5.5 N hydrochloric acid in dioxan. After standing for 3 days at 0° C. the reaction mixture was poured into a solution of ammonium bicarbonate and extracted with chloroform. The residue obtained after evaporation of the chloroform extract was taken up in ether and filtered off with suction. There was obtained 0.8 g. (25% of theory) exo-2',3' - O - benzylidene-5'-desoxy-5'-chloroinosine, which had a melting point of 100–103° C.

The 5'-desoxy-5'-chloroinosine used as starting material was prepared by the following method: 14 g. 2',3'-O-isopropylidene-5'-tosyl-inosine were dissolved in 150 ml. dimethyl sulfoxide. 14.5 g. lithium chloride were added thereto and the resulting mixture then heated for 30 minutes at 100° C. After cooling, the reaction mixture was poured into 300 ml. water. The precipitate which was thereby formed was filtered off with suction, washed with water and dissolved in 25 ml. formic acid. Water was then added until a cloudiness had set in and thereafter the mixture was allowed to stand for 4 days. The mixture was then evaporated in a vacuum and the residue taken up with a solution of ammonium bicarbonate. The precipitate was filtered off with suction and recrystallized from water. There were obtained 4 g. (46% of theory) 5'-desoxy-5'-chloroinosine, which had a melting point of 180° C. (decomp.).

*Variant B.*—20 g. exo-2',3'-O-benzylidene-inosine were dissolved in 320 ml. dry pyridine, 40 g. p-toluene-sulfochloride were added portionwise at ambient temperature, while stirring. The clear, yellow solution which was produced was left to stand for one day at 0° C. and for one day ambient temperature. The reaction mixture was then poured into a solution of 40 g. sodium bicarbonate in 3000 ml. water and extracted with chloroform. The dried chloroform extract was evaporated and the 25 g. residue was dissolved in 240 ml. dimethyl sulfoxide. 28 g. lithium chloride were added thereto and the reaction mixture heated for 30 minutes on a boiling water bath. The cooled mixture was poured into 800 ml. water, filtered with suction, washed with water and dried. There were obtained 9.5 g. (45% of theory) exo-2',3'-O-benzylidene-5'-desoxy-5'-chloroinosine, which had a melting point of 100–103° C.

The compounds in accordance with the invention belong to the class of compounds known as nucleoside ketals. This class of compounds is characterized in that they effect simultaneously with an increase in the heart minute volume an increase in the blood circulation to the kidneys. As a result, on administration of a nucleoside ketal, a distinct increase in the excretion of sodium takes place. Therefore the increased excretion of sodium can be used to evaluate the circulation stimulating activity of new compounds falling within this class or structurally closely related to the compounds of this class.

The test procedures involved in determining whether or not there has been an increase in sodium excretion as compared to the procedures involved in directly measuring changes in circulation dynamics are much simpler and easier to carry out. Further the determinations regarding sodium excretion can be carried out using unanesthetized animals and over considerably prolonged periods. In this connection, only those compounds are considered effective whose activity is manifested over a prolonged period.

The test procedures were carried out on female Sprague-Dawley rats. The control sodium values were established, the test compounds were then administered orally (10 ml./kg. of an aqueous suspension containing additionally 0.5% tylose). The animal's urine was then collected for 6 hours and the sodium content again determined.

The following compounds were employed in the test procedures:

A—2',3'-isopropylidene-adenosine (comparison)
B—exo-2',3'-O-benzylidene-inosine
C—exo-2',3'-O-(3-chlorobenzylidene)-inosine
D—exo-2',3'-O-(4-chlorobenzylidene)-inosine
E—2',3'-O-(4-methoxy-benzylidene)-inosine
F—exo-2',3'-O-benzylidene-5'-desoxy-5'-chloroinosine The results of the test procedures are set out in the following table:

TABLE.—SODIUM EXCRETION IN URINE FOLLOWING ORAL ADMINISTRATION OF TEST COMPOUND

| Compounds: | Mg./Kg. | Example | mVal Na/Kg. in 6 hrs. | Number of rats |
|---|---|---|---|---|
| Control | | | 0.42 | 90 |
| A | 50 | (¹) | 0.36 | 15 |
| B | 25 | 1 | 0.90 | 15 |
| C | 25 | 3 | 11.1 | 15 |
| D | 25 | 4 | 1.00 | 15 |
| E | 25 | 5 | 0.64 | 15 |
| F | 25 | 6 | 1.40 | 15 |

¹ 2'-3'-isopropylidene-adenosine (Comparison).

As can be seen from the table, the comparison compound, isopropylidene-adenosine was entirely without effect as concerns increased excretion of sodium. In contrast, the compounds of the invention are effective to cause an increase in the excretion of sodium of up to 3.5 fold that observed in the control (untreated) animal.

As previously indicated, the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 50–500 mg. active ingredient per dosage unit. Preferably, the compositions are compounded so that for parenteral administration, 50–200 mg. of active compound/dosage unit is present and for oral administration 200–500 mg. of compound/dosage unit.

What is claimed is:
1. An inosine acetal having the formula:

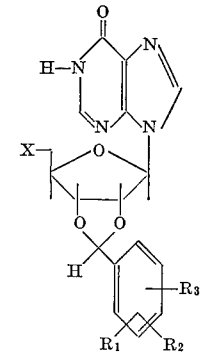

wherein $R_1$, $R_2$ and $R_3$ are selected from the group consisting of hydrogen, chloro, lower alkyl and lower alkoxy, and X is a member selected from the group consisting of chloro and hydroxyl.

2. An inosine acetal according to claim 1 designated exo-2′,3′-O-benzylidene-inosine.

3. An inosine acetal according to claim 1 designated exo-2′,3′-O-(3-chlorobenzylidene)-inosine.

4. An inosine acetal according to claim 1 designated exo-2′,3′-O-(4-chlorobenzylidene)-inosine.

5. An inosine acetal according to claim 1 designated exo-2′,3′-O-benzylidene-5′-desoxy-5′-chloroinosine.

References Cited

UNITED STATES PATENTS

| | | | |
|---|---|---|---|
| 3,282,920 | 11/1966 | Ouchi et al. | 260—211.5 |
| 3,282,921 | 11/1966 | Verheyden et al. | 260—211.5 |
| 3,346,562 | 10/1967 | Honjo et al. | 260—211.5 |

ELBERT L. ROBERTS, Primary Examiner

J. R. BROWN, Assistant Examiner

U.S. Cl. X.R.

424—180

UNITED STATES PATENT OFFICE
CERTIFICATE OF CORRECTION

Patent No. 3,520,873                          July 21, 1970

Max Thiel et al.

It is certified that error appears in the above identified patent and that said Letters Patent are hereby corrected as shown below:

In the heading to the printed specification, lines 6 and 7, "assignors to Boehringer Mannheim GmbH, Antsgeicht, Mannheim, Germany" should read -- assignors to Boehringer Mannheim GmbH, Mannheim-Waldhof, Germany, a corporation of Germany --. Column 3, line 19, "benzylaldehyde" should read -- benzaldehyde --; line 30, "Exo-2,3'" should read -- Exo-2',3' --. Column 4, line 71, "11.1" Item C under the third heading should read -- 1.11 --.

Signed and sealed this 26th day of January 1971.

(SEAL)
Attest:

EDWARD M. FLETCHER, JR.                WILLIAM E. SCHUYLER, JR.
Attesting Officer                         Commissioner of Patents